US006741992B1

(12) United States Patent
McFadden

(10) Patent No.: US 6,741,992 B1
(45) Date of Patent: May 25, 2004

(54) FLEXIBLE RULE-BASED COMMUNICATION SYSTEM AND METHOD FOR CONTROLLING THE FLOW OF AND ACCESS TO INFORMATION BETWEEN COMPUTER USERS

(75) Inventor: Brian D. McFadden, New York, NY (US)

(73) Assignee: Xtenit, New York, NY (US)

( * ) Notice: Subject to any disclaimer, the term of this patent is extended or adjusted under 35 U.S.C. 154(b) by 0 days.

(21) Appl. No.: 09/363,998

(22) Filed: Jul. 29, 1999

(51) Int. Cl.[7] .......................... G06F 17/30; G06F 15/16
(52) U.S. Cl. ........................ 707/10; 707/5; 707/513; 706/47; 706/55; 709/201; 709/218
(58) Field of Search ................. 707/5, 1–4, 6, 707/10, 513; 709/201–203, 217–219; 705/7–10, 14, 26, 36–38; 345/348, 355–357; 706/47, 55

(56) References Cited

U.S. PATENT DOCUMENTS

| 5,619,648 A | * | 4/1997 | Canale et al. ............... 709/206 |
| 5,727,175 A | * | 3/1998 | Malone et al. ............. 345/356 |
| 5,794,210 A | * | 8/1998 | Goldhaber et al. ........... 705/14 |
| 5,918,014 A | * | 6/1999 | Robinson .................... 706/12 |
| 6,115,709 A | * | 9/2000 | Gilmour et al. ............... 707/9 |
| 6,151,624 A | * | 11/2000 | Teare et al. ................. 709/217 |
| 6,163,794 A | * | 12/2000 | Lange et al. ................ 709/202 |
| 6,182,029 B1 | * | 1/2001 | Friedman ........................ 704/9 |
| 6,182,059 B1 | * | 1/2001 | Angotti et al. ................ 706/45 |
| 6,199,077 B1 | * | 3/2001 | Inala et al. .................. 707/501 |
| 6,253,188 B1 | * | 6/2001 | Witek et al. ................... 705/1 |
| 6,356,920 B1 | * | 3/2002 | Vandersluis .............. 707/501.1 |

OTHER PUBLICATIONS

"XML: Not a Silver Bullet, But a Great Pipe Wrench," Tommie Usdin et al., StandardView vol. 6, No. 3, Sep., 1998, pp. 125–132.*

"An XML–based Wrapper Generator for Web Information Extraction," Ling Liu et al., ACM SIGMOD Record, Proceedings of the ACM SIGMOD International Conference on Management of Data, Jun. 1999, vol. 28, No. 2, pp. 540–543.*

* cited by examiner

Primary Examiner—Hosain T. Alam
(74) Attorney, Agent, or Firm—Raysman Brown

(57) ABSTRACT

Flexible rule-based information system allows information originators, administrators, recipients, and requesters (collectively, "users") to control and influence the flow of and access to information. How much control each user is given depends on the configuration of the system by the administrator and the choice of system-wide rules by the administrator. The originators generate messages or evaluate external content, then optionally specify rules indicating the type of recipients they would like to reach. Recipients specify rules indicating what types of messages and from what types of originators they want to receive. Users provide profile information and have incentive to provide as much information as possible so as to trigger the right rules.

15 Claims, 8 Drawing Sheets

FLEXIBLE RULE-BASED COMMUNICATION SYSTEM AND METHOD FOR CONTROLLING THE FLOW OF AND ACCESS TO INFORMATION BETWEEN COMPUTER USERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to systems and methods that allow for control of the flow of and access to information. More particularly, the invention relates to a system for information processing, delivery, and access with applications to information in electronic format.

While access to electronically stored information has increased drastically with the use of computers and, specifically, global computer networks such as the Internet, the cost of information access is often dominated not by the cost of the information itself or of the gathering or digitization of the information, but by the time required to sort out and evaluate data relevant to a given query. This is particularly apparent for real-time event-driven information and content. Such information includes news, notifications, advisements, announcements, commentary, press releases, message postings to Internet-based newsgroups (such as via Usenet), data in discussion groups and chat boards, as well as information generated by product searches, job searches, consulting searches, matchmaking, and networking. Often, the cost of sorting and evaluating information is too great to justify the search, resulting in an overload of information.

One existing approach to reduce the flow of information is collaborative filtering. Such filtering allows profiled users to express interest in content. The system then records the interest level and uses it to predict the interest of other users based on the similarity of their respective profiles. This approach is inappropriate for accessing and directing time-sensitive information as it is inherently not a real-time method. Further, entities employing this approach can offer users no more expertise in directing the flow of information than as determined by a group of peers, with the peers possibly having no more expertise than a given user. A related existing method, learning-by-action, is another approach that is ineffective in real-time environments.

Another existing method is known as "keyword matching" or "textual searches."Keyword matching suffers from the problem that matches are not context specific. That is, there is no efficient way to match words based on their meaning. An additional problem is that there is no uniformity of keywords. Further, "structured information" content is not utilized by this method of searching for information.

Thus there is a need for a system and method for efficiently sorting and sifting through a large information flow.

BRIEF SUMMARY OF THE INVENTION

It is an object of the present invention to provide a system and method for efficiently sorting through a large information flow.

It is another object of the present invention to provide a system and method for employing an intuitive, rule-based approach to allow information originators to more intelligently distribute their information and to allow end-users to leverage their own expertise and domain specific knowledge.

Some of the above and other objects of the present invention are achieved by a method and system for distributing information between an originator and at least one end-user. According to the invention, the originator generates a message rule for indicating types of end-users that are eligible to receive the information. An end-user generates a profile rule for indicating types of information and types of originators that the end-user would be interested in receiving the information from. Further, an administrator generates a system rule for indicating what types of information from what types of originators should be delivered to what types of end-users. Then, at least one end-user is identified that is eligible and interested to receive the information on the basis of the generated message, profile and system rules. And the information is delivered to the identified at least one end-user.

According to one aspect of the present invention, the identity of the end-user is not disclosed to the originator. According to another aspect of the present invention, the generated message, profile and system rules are specified by an autonomous agent.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Figure 1:
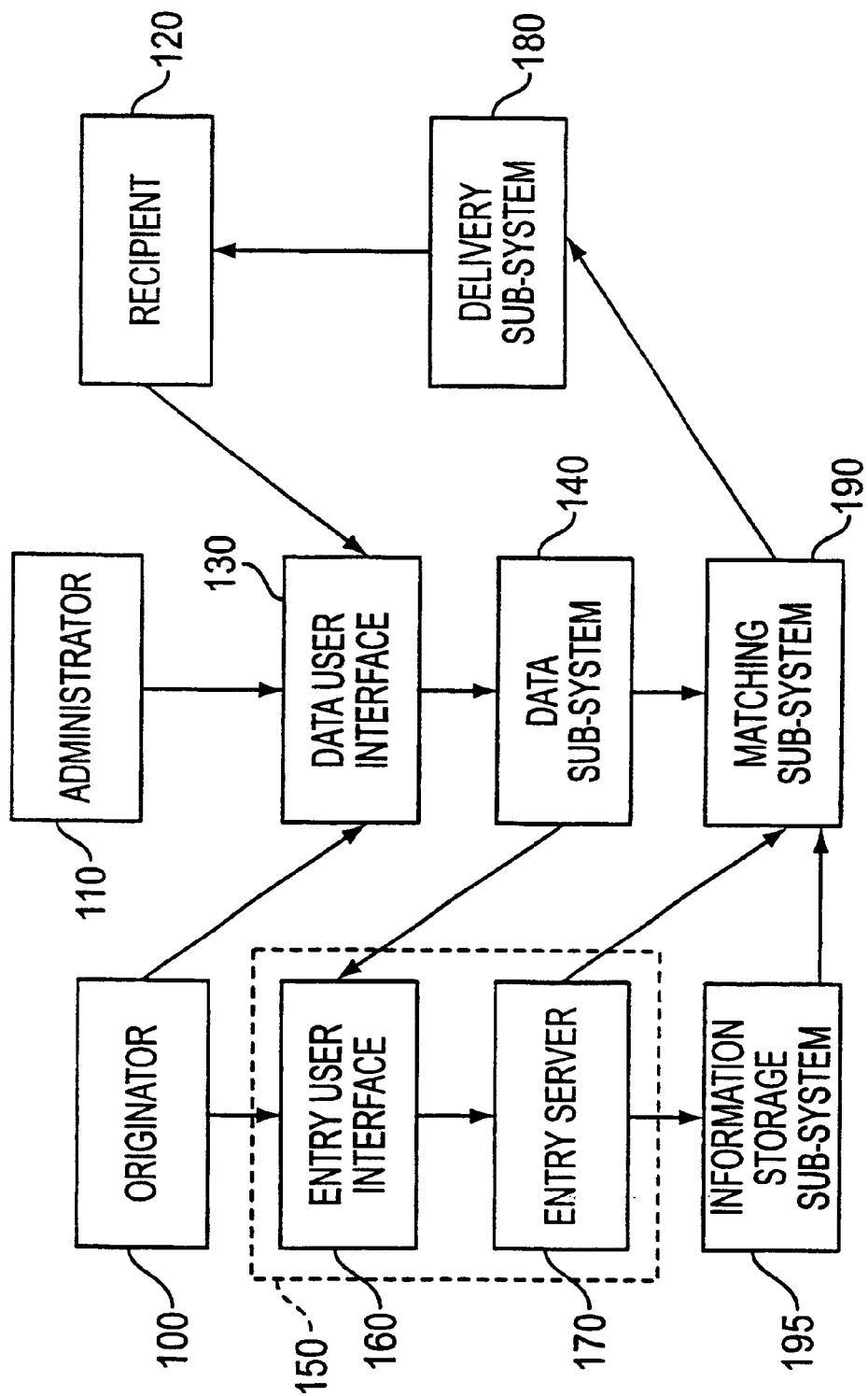
FIG. 1 is a schematic diagram of a preferred embodiment of the present invention for targeted distribution, comprising a recipient and a delivery, sub-system.

As a general overview, a flexible rule-based information system allows information originators, administrators, recipients, and requesters (collectively, "users") to control and influence the flow of and access to information. How much control each user is given depends on the configuration of the system by the administrator and the choice of system-wide rules by the administrator.

The originators generate messages or evaluate external content, then optionally specify rules indicating the type of recipients they would like to reach. Recipients specify rules indicating what types of messages and from what types of originators they want to receive. Users provide profile information and have incentive to provide as much information as possible so as to trigger the right rules. Messages and profiles are structured information that can contain nested and repeated data groups to any arbitrary level. The rules reference profiles and messages, and are specified in a standard logic fonnat capable of addressing multiple levels of data nesting while abstracting from the details of procedural and query languages.

The system maintains sets of information topics to be used for describing profiles, content, and messages. Users can add and embed additional descriptive topics in profiles and messages and add rules to reference new topics, making the process dynamic and adaptive. The process can work as conduit between humans whereby all users are humans or wherein any combination of users may be mechanical or computational agents.

By employing an intuitive rule-based approach to allow information originators to more intelligently distribute their information and by allowing end-users to leverage their own expertise and domain specific knowledge, the present invention can greatly reduce the total cost of information access, filtering, and processing.

Profiles, as used in this invention, consist of information and data about or characterizing a particular user or autonomous agent, and can be broad and encompassing without limit. For example, profile data could include financial data about investments, transactions, risk preferences, and expertise with various aspects of financial decision making. An example of profile information could also include medical information and history that would include all known ailments and treatments. Another example of profile information is career information that includes details of work experiences and skills, or detailed hobby information about expertise and experiences with any recreational activity. Still another example of profile is purchasing objectives, decision patterns and influence on buying decisions.

Rules, as used in this invention, can be expressed in natural language and reference any profile and message data. For example, some rules pertaining to financial domain might be "Send introductory research reports with recommendations to recipients who are active and knowledgeable investors and do not hold any securities in the mentioned industries". Another example might be "Send all messages from active computer programmers with entrepreneurial business ambitions who are looking for any kind of legal advise", or "Send RFP to consultants in the facilities management business who have been purchasing agents", or "Don't send job posts from recruiters". In the family medical space a rule might be "Alert active mountain bikers about news stories detailing lime disease outbreaks in their state."

With reference to FIGS. 1, 2, 3, and 4, one preferred embodiment of the present invention includes users 100, 110, 120, 200, sub-systems 140, 150, 180, 190, 195, 210 and data storage 310, 320, 330, 410, 420. The users, categorized as originators 100, administrators 110, recipients 120, and requesters 200, may be humans or computer agents. The sub-systems may include such sub-systems as entry 150, data 140, information storage 195, matching 190, delivery 180, direct request 210. The data storage may contain content, profiles, topics, and rules.

FIG. 1 is a schematic representation of an embodiment of the present invention operating as a rule-based information system with a component for targeted distribution. The flow of information starts with an originator 100. An originator 100 interacts with the system by providing information to an entry sub-system 150 and a data sub-system 140. An administrator 110 interacts with the data sub-system 140. A recipient 120 interacts with data sub-system 140 and a delivery sub-system 180. While FIG. 1 shows a single originator 100, a single administrator 110, and a single recipient 120, it will be appreciated by those skilled in the art that there may be any number of each of originators 100, administrators 110, and recipients 120. Each of the originators 100, administrators 110, and recipients 120 may be either human or a computer-agent or process.

All sub-systems interacting with any of the originators 100, administrators 110, recipients 120, or requesters 200 have both a computer user interface ("UI") 130, 160 for interaction with humans and an application programming interface ("API"), object, or module interface for direct interaction with computer agents and other processes. In a preferred embodiment, the user interface is graphical and supports keyboard, mouse, and/or voice-activated entry. The user interface comprises client and server components, with the Internet- and network-accessible client components operating in a web-browser, as a plug-in, or as any network distributed program. The client and server parts of the user interface interact using secure and non-secure Internet, network, and distributed object protocols. Further, the server component interacts with the other sub-systems using standard Internet, network, and distributed object protocols. Sub-systems interacting with computer agents or mechanical devices employ an API that is implemented using standard Internet, network, and distributed object protocols.

Sub-systems interacting with users (human and/or computer) support a scaleable number of connections. This means that a large number of users can be connected to the entry 150, data 140, delivery 180, and direct request 210 sub-systems simultaneously. The maximum number is limited only by the bandwidth utilized by the process and the size and number of computer servers running the system portion of the process.

The matching sub-system 190 is a multi-threaded and distributed sub-system. It is implemented as a continually operating computer process or service on at least one server.

The messages that move through the system from originator 100 to entry sub-system 150 to matching sub-system 190 to delivery sub-system 180 to recipient 120 comprise "structured information" and/or objects. Structured information is information in Extensible Markup Language ("XML") and Standardized General Markup Language ("SGML"), and the objects are computer program representations of messages that can be expressed in those formats. The messages may contain references to separate content in the form of links that may or may not be stored in information storage. Nothing in this description should be interpreted to limit the nature of external content that is referenced by the messages.

Figure 2:
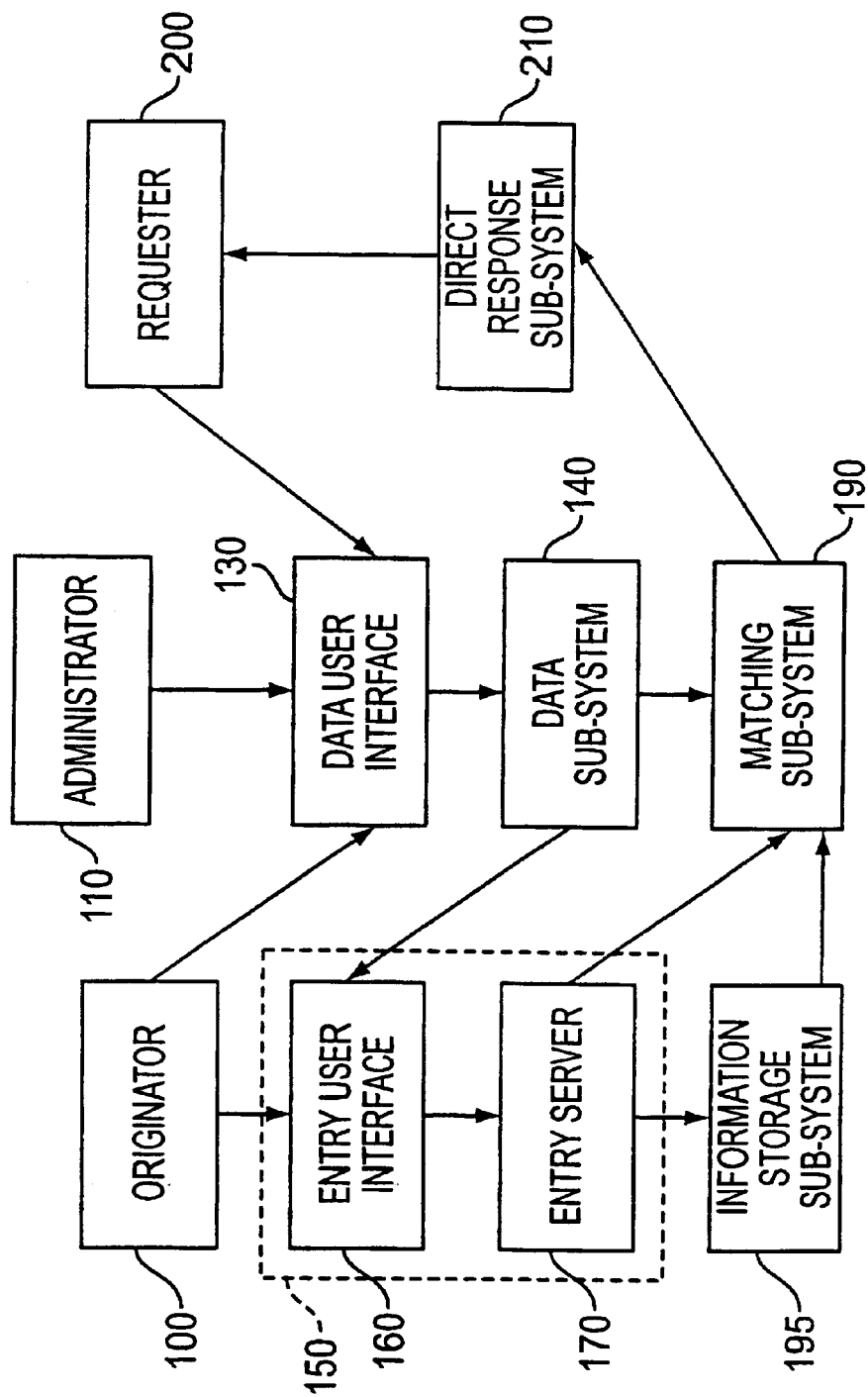
FIG. 2 is a schematic diagram of a preferred embodiment of the present invention for direct access, comprising a requester and a direct-request sub-system.

FIG. 2 is a schematic representation of an embodiment of the invention as a rule-based information system with a component for direct access. In this embodiment, the process is similar to the embodiment represented in FIG. 1, except that the recipient 120 has been replaced with a requester 200. While a recipient 120 is reactive with respect to the receipt of information, a requester 200 is proactive. A requester 200 interacts with a direct request sub-system 210.

Figure 3:
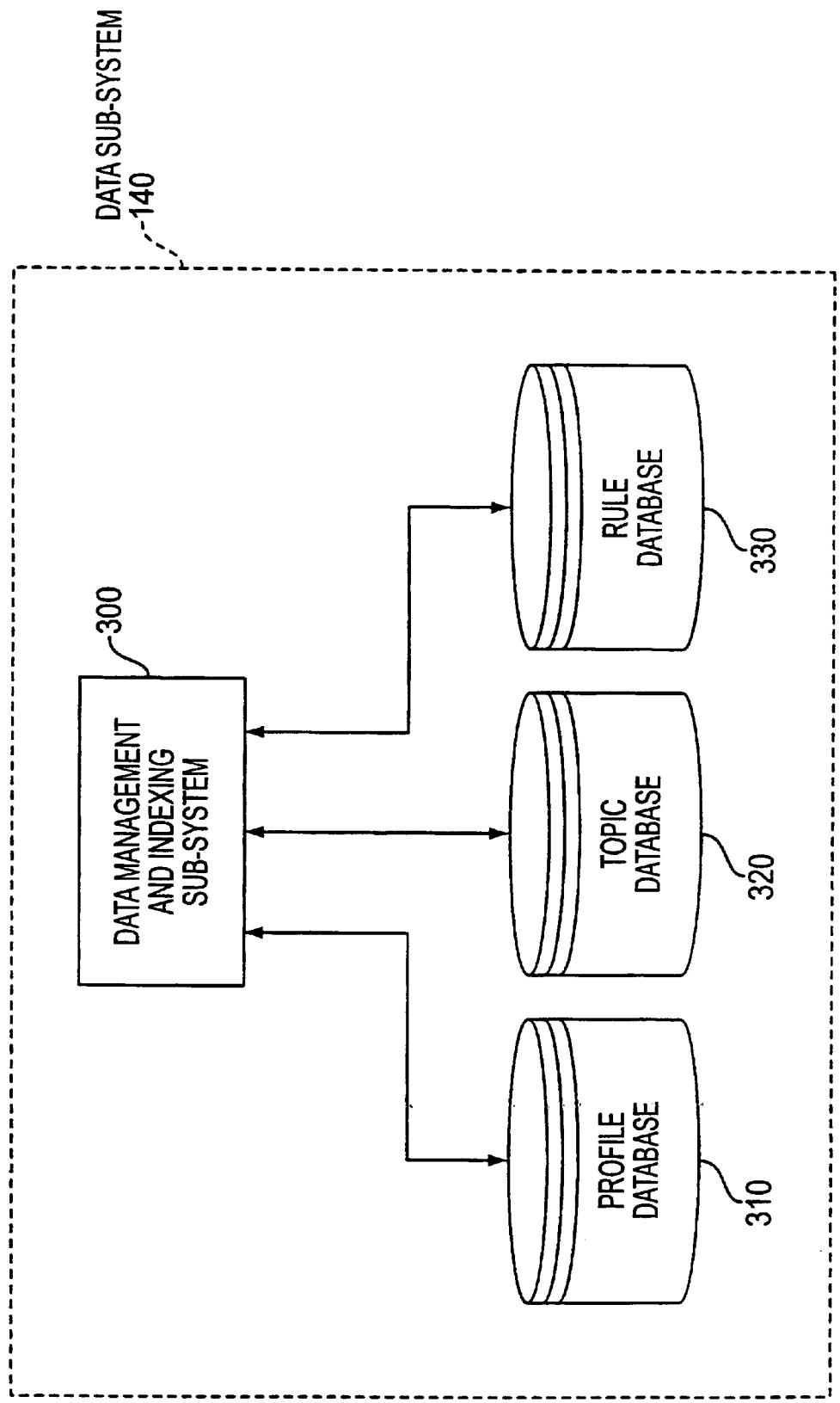
FIG. 3 is a schematic diagram of a data sub-system of a preferred embodiment of the present invention.

FIG. 3 is a schematic representation of the data sub-system 140 that includes a data management and indexing sub-system 300 for handling requests for data as well as the addition and updating of data. The data is stored in profile database 310, topic database 320, and rule database 330.

Topics contained in the topic database 320 describe information sets. Each topic includes definition and display data. The topic definition data is an SGML/XML Document Type Definition ("DTD") or XML Definition Schema. It describes the type and characteristics of the information that compose a topic. The topic display information describes how an instance of a topic will be displayed singularly or in a form editor or rules editor. There are three types of topics: "profile topics" describing profiles; "message topics" describing messages and incoming information; and "system topics" that have special system or configuration meaning.

Profiles and messages contained in the profile database 310 comprise instances of topics. When specifying descriptive information for topics it will be necessary for this information to adhere to one or more topic definitions. The user interfaces that are part of the entry 150 and data 130 sub-systems for editing and adding profile data and for adding messages use the topic display information to construct the forms presented to users.

All topic information is a combination of XML and XML definitions. It is stored in the topic database 320, with each entry indexed by topic name and meta-data describing each topic.

Profiles are XML data sets validating to one or more topics. They are stored in the profile database 310 with each entry indexed by topics used and data values for elements and attributes within topics.

As mentioned above, rules contained in the rule database 330 are XML representations of "If-Condition-Then-Actions-Else-Actions" statements. Rules are "system rules" entered by an administrator 110, "profile rules" entered by all users, "request rules" entered by a requester 200, or "message rules" entered by an originator 100. In a preferred embodiment of the present invention, each type of rule is stored in a separate database. Topic reference, elements and attributes, type, and creator index all rules. "Profile rules" are grouped by creator. "Message rules" are grouped by message. "Requester rules" may be stored temporarily, if at all. Topics, profiles, and rules are all stored either as text in XML format or objects representing XML.

Figure 4:
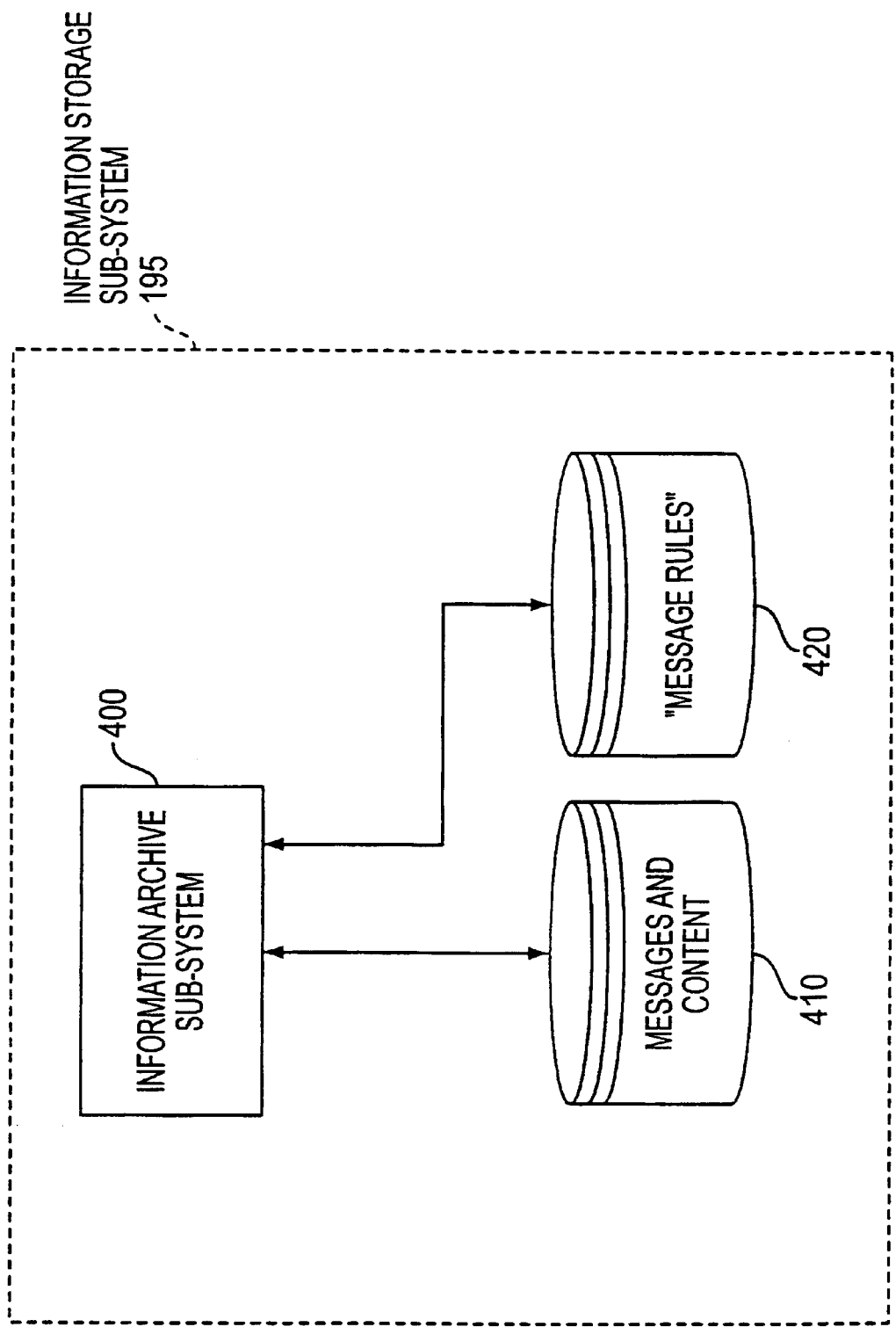
FIG. 4 is a schematic diagram of an information storage sub-system of a preferred embodiment of the present invention.

FIG. 4 is a schematic representation of the information storage sub-system 195. An information archive sub-system 400 handles requests for content as-well as the addition and updating of content. The information archive sub-system 400 retrieves information from message and content database 410 and message rule database 420.

Messages are XML data sets validating to one or more topics. They are stored in a database with each entry indexed by topics used and data values for select fields within topics.

Depending on the embodiment and the raw form, content may or may not be stored together with the messages in the information archive. In the event that content is not stored together with the messages in the information archive, the messages will reference the external content items.

Referring to FIG. 1, the entry sub-system 150 gets new information from an originator 100, stores information in an information storage sub-system 195, and provides the information to a matching sub-system 190. Information from the entry sub-system 150 is evaluated by the matching sub-system 190 along with data from a data sub-system 140 to determine which recipients 120 will receive the information. When a recipient 120 is identified as a target for the information, the delivery sub-system 180 notifies that recipient 120.

If the originator 100 is a human, the entry sub-system 150 is preferably a computer user interface. The computer user interface is preferably graphical and allows originators 100 to interact with the system via keyboard, mouse, voice-activated entry, and/or some other form of entry. The entry user interface 160 gets profile data about the originator 100 and based on that profile makes available a set of topics that the originator 100 can select to describe the message or information that is entered. After the originator 100 selects a sub-set of topics to be used, he enters descriptive information for each topic selected. The entry form presented to the originator 100 will depend on the topics selected and the display data for each topic as stored in the data sub-system 140. A special topic is used for profile configuration data and it is this configuration data that is used to determine the set of topics available to each originator 100.

If the originator 100 is a computer agent or mechanical device, it interacts with the system via an API, object interface, or access module. Interaction may bypass the user interface 160 and go directly to an entry server 170 or interact with a variation of interface. Interaction with and within the system preferably uses standard Internet, network, or distributed object protocols. If the agent or device interacts with an interface, it is able to register as a specific originator 100 and get a list of available topics. It is also able to check that the message or entered information is valid for the selected topics.

An originator 100 may also enter "message rules" specific to the message or information. These rules will be attached to the message as it flows through the system and are stored with or in parallel with the message in the information storage.

In a preferred embodiment, all users (i.e., originators 100, administrators 110, recipients 120, and/or requesters 200) may enter profile rules. Entry of profile rules data occurs via a data user interface. For each rule, a user selects topics from a set of available topics. These topics include both message- and profile-specific topics. After a user selects a sub-set of topics to be used, the user will construct a rule. The rule construction form presented to the user will depend on the topics selected and the display data for each topic used to create the rule construction form. The rule construction procedure allows a user to specify one or more Boolean conditions. Each condition is constructed by selecting an operand and—depending on the operand—selecting a single reference, two references, or a reference and a value. The choice of references and values are determined from the topics and the operand selected. Topic branches, described below, map into references. The choice of operands includes all binary operands for character and numeric data (including but not limited to "<", "=", ">", "≠", "≧", "≦", "contains", "starts with", "ends with", etc.). Conditions can be combined using logical operators ("AND", "OR", "NOT").

Rule construction also involves the selection of actions to be completed if the rule evaluates "true" and alternative actions to be completed by the process if the rule evaluates "false". Actions are defined by the administrator 110 when the process is initiated and preferably include at least actions for ranking, categorizing, including, excluding, flow control (jump to another rule), etc. Rules may also be entered via a natural language interface. The "system rules" are entered similarly to "profile rules", but can only be entered by administrators 110.

In a preferred embodiment, all users (originators 100, administrators 110, recipients 120, and requesters 200) may enter profile data. Entry of profile data occurs via a data user interface. A user selects profile-specific topics from a set of available topics. After the user selects a sub-set of topics to be used, they enter descriptive information for each topic selected. The entry form presented to the user will depend on the topics selected and the display data for each topic as stored in the data sub-system. A special "system topic" is used for profile configuration data and this configuration data will be entered first and used to determine the set of topics available to each user.

In a preferred embodiment, all users (originators 100, administrators 110, recipients 120, and requesters 200) may enter topics. In a typical embodiment with many users, restrictions are placed on the creation of new topics. New topics are entered via a topic entry form that is part of the data user interface. This form facilitates the entry of a definition describing an information set. The information set contains multiple data elements and attributes and allows nested and repeated data groups to any arbitrary level. Topics can be edited but it may be necessary to create maps from old versions of a topic so that all parts of the process that reference data described in the older version can be updated. System topics are part of the initial system and cannot be edited. The distinction between profile topics and message topics is made when a new topic is created.

Topic creation is a multi-step procedure. In the first step, the definition of the information set is completed. Users specify an arrangement of data elements and attributes with nested and repeated data groups to any arbitrary level. Based on this definition, a sequence of branches is derived. Every defined element and attribute will be a branch, and each branch will represent either a grouping branch or an entry point branch. This derivation will be stored as part of a topic. In the second step of the topic creation procedure, additional display data is entered for each branch. Some display information will be determined automatically from the topic definition and the rest is specified as part of the creation procedure. Topic display data include data to be used by the rule constructors, profile editors, message editors and display devices. The display data for each branch includes but is not limited to description, type, display name, choices, format, etc.

Referring to FIG. 1, the matching sub-system 190 determines which recipients 120 should receive a given message from the entry sub-system 150. In a preferred embodiment, the matching procedure includes several steps. A typical embodiment of the system employs these steps: first, system rules and message rules are combined, giving priority to one type of rules over the other depending on configuration options set by administrators. Next, using, the references to topic branches, operands, and values specified, within each rule, a preliminary set of recipients' profiles is determined. Indexing on the profile rules further refines this set. With a fully refined set of recipients the system rules, message rules and profile rules are applied to determine which recipients should receive the message. This list of recipients is passed on to the delivery sub-system 180.

After the delivery sub-system 180 receives a list of recipients and a message from the matching sub-system 190, configuration profiles are obtained for each recipient 120. This information will be used to determine how to transmit the message to its recipient 120. Messages may be transmitted via e-mail, fax, postal mail, Internet protocols, wireless electronic delivery, sonar, radar, foot messenger or any other delivery mechanism or method without affecting the nature of the process. Messages may also be logged to a special file or other device for later retrieval by a recipient 120.

FIG. 2 represents an embodiment of the present invention as a rule-based information system with a component for direct access. The embodiment represented in FIG. 2 is similar to the embodiment represented in FIG. 1, except that a requester 120 has replaced the recipient 200. While a recipient 120 is reactive with respect to the receipt of information, a requester 200 is proactive. A requester 200 interacts with a direct request sub-system 210 to formulate a request for information. The matching sub-system 190 processes the request together with data from the data sub-system 140 and determines what information from a content archive will meet the request.

The request is formulated in the same manner as profile rules, as discussed above. The request in the form of requester rules is sent to the direct request sub-system 210 and then passed to a matching sub-system 190. Requester rules include the request and profile rules of the requester, if applicable. In a preferred embodiment of the present invention, the matching procedure used by the matching sub-system 190 in response to a request from the direct request sub-system 210 comprises several steps. A preferred embodiment of the process would employ these steps: first, system rules and request rules are combined, giving priority to one type of rules over the other depending on configuration options set by administrators. Next, using the references to topic branches, operands, and values specified, within each rule, a preliminary set of messages is determined. Indexing on the message rules further refines this set. With a fully refined set of messages, the system rules, message rules and requester rules are applied to determine which recipients should receive the message. This list of messages is passed on to the direct request sub-system 210 and on to the requester 200.

FIG. 3 represents the data sub-system 300 and operation of the data management and indexing with profiles 310, topics 320, and rules 330. Operation of this sub-system involves storage and indexed retrieval of data to be used elsewhere in the system. A data management and indexing sub-system 300 will support adding of new data and indexing of this data for faster retrieval. The actual algorithms used in indexing, adding, and retrieving data do not directly impact the operation of the system, provided that data is indexed for efficient retrieval and can support the functions of the matching sub-systems. Indexing is preferably by those fields as indicated above.

FIG. 4 represents the information storage sub-system 400 and operation of the information archive sub-system with content and message rules. Operation of this sub-system involves storage and indexed retrieval of data to be used elsewhere in the system. An information archive supports adding of new data and indexing of this data for faster retrieval. The actual algorithms used in indexing, adding, and retrieving data do not directly impact the operation of the system, provided that data is indexed for efficient retrieval and supports the functions of the matching sub-systems. Indexing is preferably by those fields as indicated above.

The flow of information (messages and content) through the system is determined by the various types of rules described here. Rules are used by the matching sub-system as also described here. The interaction between topics and rules facilitates the main features of the system.

The topic creation procedure maps data definitions into branches. These branches are the references used for constructing rules and the mapping removes a user from having to contend with nested and repeated data groups when specifying rules. The branch mapping is determined by constructing a tree from the topic definition. Each defined element and attribute is placed in the tree. Multiple occurrences of an element are ignored. The branches will terminate at any point where an element contains other elements that are undefined. A defined element may be represented by more than one branch.

An example of a branch mapping based on the following XML DTD is provided immediately below the following XML DTD:

```
<! ELEMENT root      (p+ ,q)>
<! ELEMENT p         (c* ,b) >
<! ELEMENT q         (c+ ,b|d) >
<! ATTLIST q a       (CDATA) #REQUIRED>
<! ELEMENT c         (#PCDATA) >
<! ELEMENT b         (#PCDATA) >
<! ELEMENT d         (ANY) >
```

| Branch Name | Branch Type | Branch Path | End Node |
|---|---|---|---|
| ROOT | Grouping | /root | root |
| P | Grouping | /root/p | p |
| Q | Grouping | /root/q | q |
| C1 | Entry | /root/p/c | c |
| C2 | Entry | /root/q/c | c |
| B1 | Entry | /root/p/b | b |
| B2 | Entry | /root/q/b | b |
| D | Entry | /root/q/d | d |
| A | Entry | /root/q/a | a |

The use of XML syntax is for explanatory purposes only.

An example of a profile or message that may be specified from a topic with the above data definition is:

```
<root>
   <p>
      <c>X</c>
      <c>Z</c>
      <c>V</c>
      <b>alpha</b>
   </p>
   <p>
      <c>Y</c>
      <c>W</c>
      <c>U</c>
      <b>beta</b>
   </p>
   <q a="hello" >
      <c>T</c>
      <b>gamma</b>
   </q>
</root>
```

Rules are constructed from Boolean expressions involving branches. Each branch referred to in the rule will reference data in the message or profile. Combining expressions within a rule can impact the interpretation of that rule. References based on user selections may be interpreted as tag matches, path matches, or branch matches. In a preferred embodiment of the present invention, the default is branch match. This interpretation of rules is used by the matching sub-system 190 to control the flow and access of information through the process. The differences are clarified in the following table:

| Rule | Branch Match | Tag Match | Path Match |
|---|---|---|---|
| C1 ≠ S | True | True | True |
| C1 ≠ X | False | False | False |
| C1 ≠ X AND B1 = beta | True | False | False |
| C1 = X AND B1 = beta | False | True | True |
| C1 = X AND B1 = gamma | False | True | False |
| C1 = X AND B1 ≠ gamma | True | False | True |

The operation of the system according to the preferred embodiment of the present invention will now be described with reference to FIGS. 5 and 6 corresponding to the targeted distribution architecture shown in FIG. 1.

Figure 5:
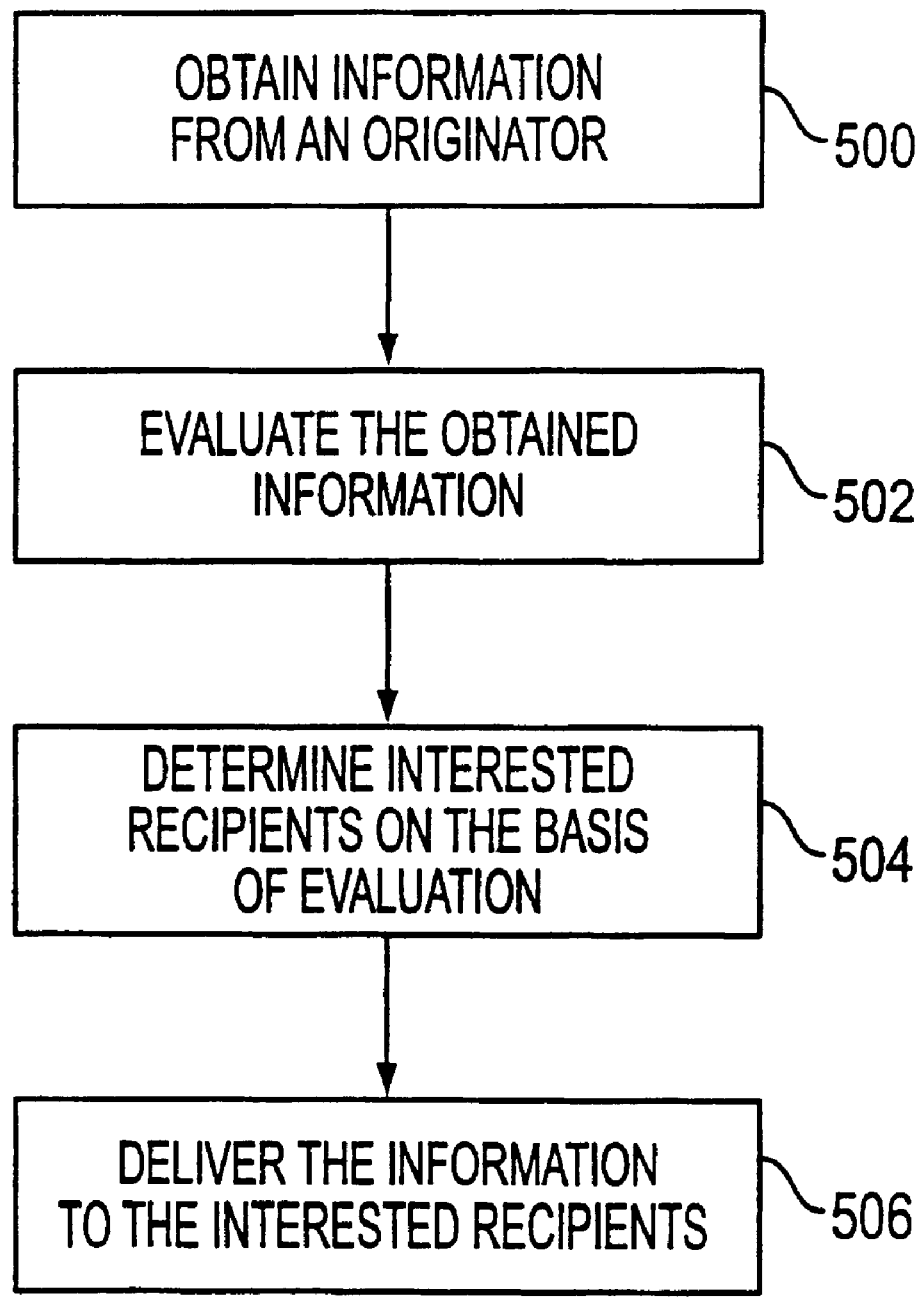
FIG. 5 illustrates a high level flowchart for controlling the flow of information from an originator to a recipient according to one aspect of the present invention.

FIG. 5 illustrates a high level flowchart for controlling the flow of information from an originator to a recipient according to one aspect of the present invention. As shown in the figure, information is provided by originator 100 in step 500. That is, originator 100 enters the information into the system using entry user interface 160. The entered information is then evaluated by matching sub-system 190 in step 502. In step 504, interested recipients for the entered information are determined on the basis of evaluation in step 502. In step 506, the information is delivered to the interested recipients, such as recipient 120.

Next, the operations shown in FIG. 5 will be described in more detail with reference to FIG. 6. In step 600, users enter profile data into the system using data user interface 130. The profile data includes various information about the users, which is subsequently used to route a message to a proper recipient as explained more fully below. In step 602, at the start of the operation by a particular originator, the profile data about that originator is retrieved from profile database 310 of data sub-system 140. In step 604, a set of topics is then presented to the originator on the basis of the obtained profile data in step 602. The topics are retrieved from the topic database 320 of data sub-system 140. In step 606, the originator selects a topic or topics from those presented to him in step 604. Representative topic may be selected as "international business and "telecommunications industry". In step 608, the originator enters a message and enters data related to the selected topics, which he desires to send to interested recipients. As an example, the message may be as follows: "Nippon Telegraph and Telephone of Japan is divided into 3 telecommunications companies." The originator would enter data as defined for the chosen topics "international business" and "telecommunications industry" and optionally a set of message rules to reflect the originator's target audience. It is understood, of course, that instead of entering the message, the originator may reference content data in information storage sub-system 195 or, alternatively, the message may contain links to external content.

Figure 6:
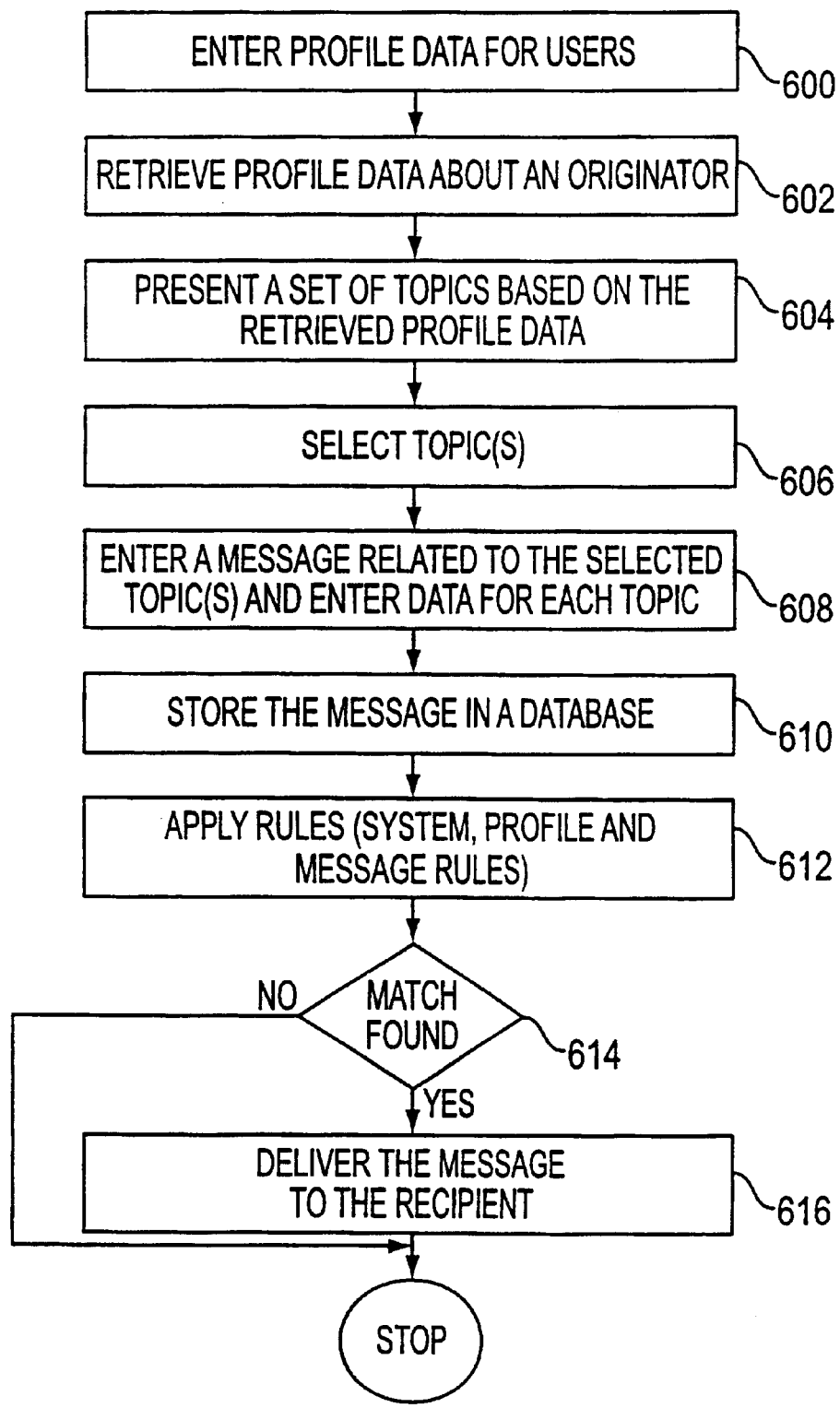
FIG. 6 shows a flowchart for describing the operations shown in FIG. 5 in more detail.

Continuing with the description of FIG. 6, in step 610 the message is stored in the database 410 of information storage sub-system 195, and then rules are applied in step 612 for properly routing the message or content data. The rules for identifying the interested recipients are retrieved from rule database 330 and include system rules generated by an administrator and may optionally include message rules, associated with the message, that are generated by the originator, and profile rules of the potential recipients. In step 614, a determination is made on whether a match has been found, i.e., recipient(s) determined, on the basis of the applied rules. If so, the message or content data is delivered to the interested recipients in step 616.

Next, the operation of the system according to the preferred embodiment of the present invention will now be described with reference to FIGS. 7 and 8 corresponding to the direct access architecture shown in FIG. 2.

Figure 7:
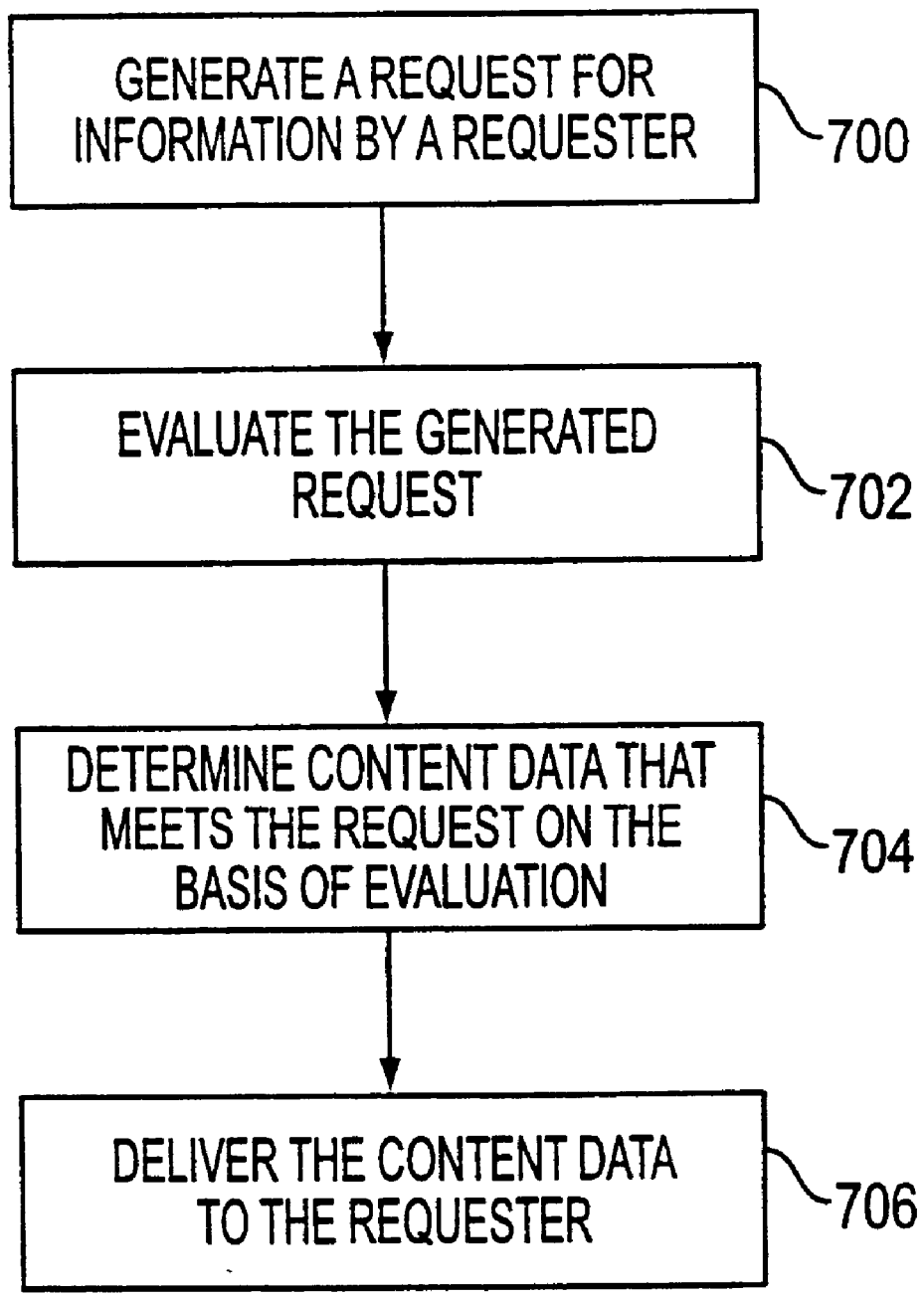
FIG. 7 shows a high level flowchart for providing a direct access to information by a recipient according to another aspect of the present invention.

FIG. 7 shows a high level flowchart for providing a direct access to information by a recipient according to another aspect of the present invention. In step 700, requester 200 generates a request for information from a content archive. In step 702, the generated request is evaluated by matching sub-system 190, and content data that meets the request on the basis of evaluation is determined in step 704. In step 706, the content data is delivered to the recipient.

The operations shown in FIG. 7 will be described in more detail with reference to FIG. 8. In step 800, users enter profile data into the system using data user interface 130. The profile data includes various information about the users, which is subsequently used to access information as explained more fully below. In step 802, at the start of the operation by a particular requester, the profile data, if exists, about that requester is retrieved from profile database 310 of data sub-system 140. In step 804, a set of topics is then presented to the requester on the basis of the obtained profile data in step 802. The topics are retrieved from the topic database 320 of data sub-system 140. In step 806, the requester selects a topic or topics from those presented to him in step 804. In step 808, the requester enters a selection rule for retrieving the information. The formulation and presentation of the selection rule interface is specific to the topics selected.

Figure 8:
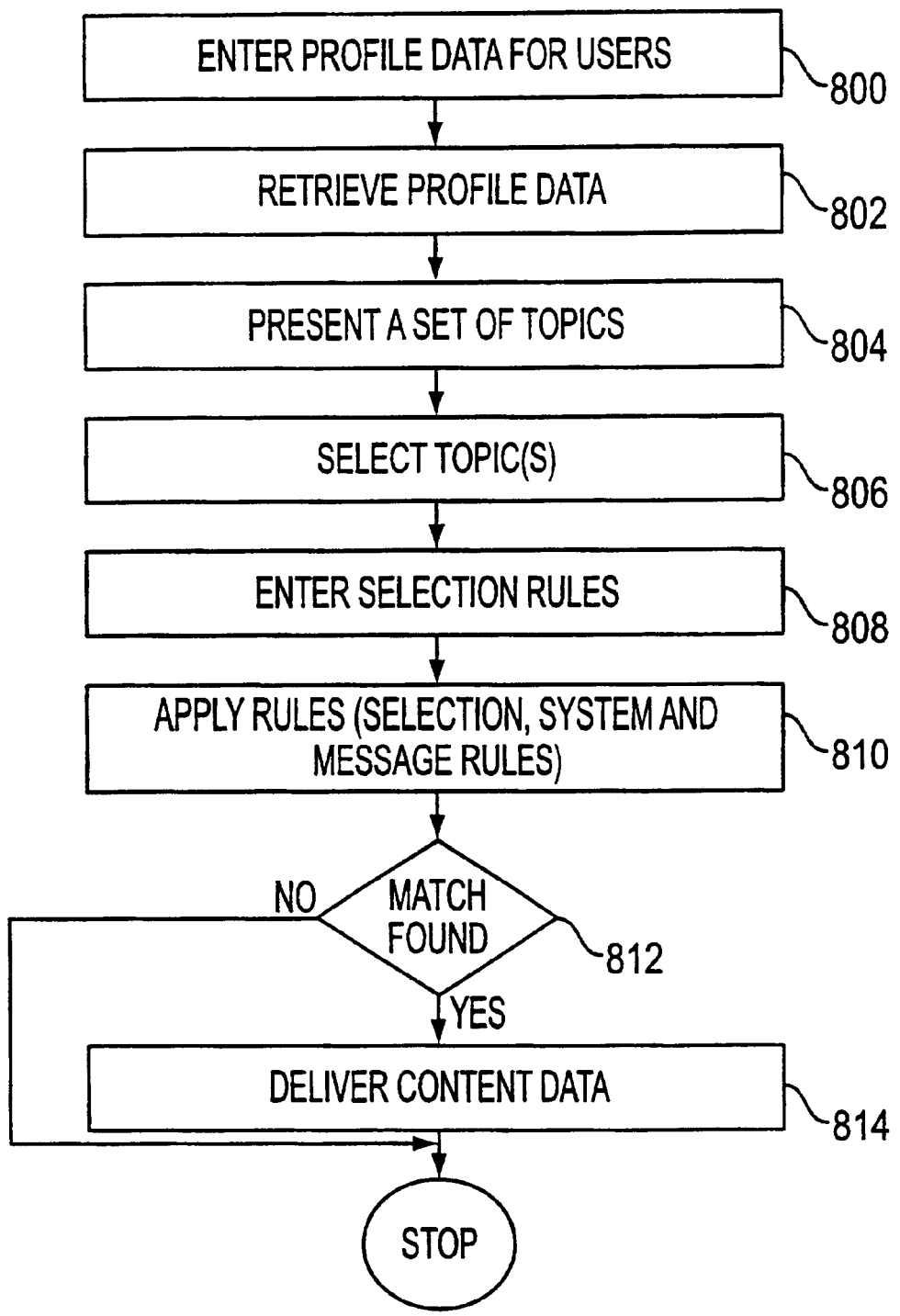
FIG. 8 shows a flowchart for describing the operations shown in FIG. 7 in more detail.

Continuing with the description of FIG. 8, in step 810 the rules, including the selection rules and optionally message and system rules, are applied for accessing the content archive. In step 812, a determination is made on whether a match has been found, i.e., content data ascertained, on the basis of the applied rules. If so, the content data is delivered to the interested requester in step 814.

A typical use of the system may involve thousands and possibly millions of users. Thousands of messages may be transferred daily. However, as a simple example let it be assumed that there are 2 users, and a single message is entered into the system by the second user.

The first user's profile includes, amongst a multitude of profile information, the characterization that could be described as "Patent Attorney specializing in a variety of bio related fields". The second user's profile includes, amongst other characterizations, that she is medical worker with an advanced degree. The second user posts a request for contemporary legal information related to the application of medical devices. To complete this post, the second user selects topics pertaining to legal and medical fields and fills in relevant data for each topic. For the legal topic the second user indicates some general selections, and for the medical device the second user indicates applications and descriptions of "valves" and "inhibitors". The second user also specifies "Message Rules" indicating that she only wants the message to go to users who are knowledgeable with the certain types of "valves"and "inhibitors". The "System Rules" dictate that messages of the type specified should be sent to "a set of users that includes certain professionals in the medical and legal fields". The above message rule narrows this list further.

The first user has a set of "Profile Rules" indicating what types of posts, and from whom, he would like to receive. His rules for receiving messages includes "posts requesting legal information from medical professionals with. advanced degrees", and hence receives the message. A third user in the medical field that indicated a non-interest in "requests for information" does not receive the message even though, based on the criteria of the System and Messages rules, he was eligible.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

For example, the system may omit any of the interactions between the data sub-system 140 and any of the administrator 100, originator 110, requester 200, or recipient 120. The system may also omit interactions with the information storage sub-system 195. Any or all of the sub-systems could be combined without changing the nature or functioning of the system. Further, the system is not dependent on any particular representation of information. Use of XML and SGML syntax and references are for explanatory purposes only. In no way is the system limited to information using these representations, and the system will work equally well with any alternative information representation that supersedes these or includes the relevant features of these representations. Further, the system is not dependent on the use of a particular database system or computer platform.

What is claimed is:

1. A system for distributing a first set of information between an originator and at least one end-user, the system comprising:

an entry sub-system for receiving from the originator an input comprising the first set of information utilized in generating a distribution rule, the distribution rule comprising a logically conditional, Boolean, computer interpretable expression;

referring branches from a multitude of contextual hierarchical information definitions with the generated distribution rule;

Interpretation utilizing context of each referenced branch from the generated distribution rule;

a direct request sub-system for receiving from an end user of the at least one end-user an input comprising profile data wherein the profile data is represented as Extensible Markup Language data comprising of multiple arbitrary nested and repeated elements and groups of elements;

a matching sub-system for matching the distribution rule with corresponding profile data inputted by the end-user; and a delivery sub-system for delivering the first set of information to the end-user that has inputted the profile data corresponding to the distribution rule.

2. The system of claim 1, wherein the distribution rule comprises Extensible Markup Language data.

3. The system of claim 1, further comprising a profile database for storing the profile data.

4. The system of claim 1, further comprising a rule database for storing the distribution rule.

5. The system of claim 1, wherein the first set of information is formatted as Extensible Markup Language data comprising of multiple arbitrary nested and repeated elements and groups of elements.

6. A method for distributing information between an originator and at least one end-user, the method comprising:

specifying at least one message topic by the originator of the information, the topic comprising a set of information conforming to a hierarchical information definition with at least one branch and wherein the message topic comprise Extensible Markup Language data;

specifying at least one profile topic by the at least on end-user, the topic comprising a set of information conforming to a hierarchical information definition with at least one branch;

specifying at least one logically conditional, Boolean, computer-interpretable rule that references information in the at least one of the message and profile topics; utilizing the rule, matching the referenced information with a preselected information context, the context comprising of values for specified branches in the message and profile topics;

utilizing the rule, matching the referenced information with a preselected information context comprising of values for specific branches in the message and profile topics; and delivering the information to the at least one end-user if the referenced information matches the preselected information context.

7. The method of claim 6, wherein the profile topic comprises Extensible Markup Language data.

8. The method of claim 6, further comprising storing the profile topic in a database.

9. The method of claim 6, further comprising storing the message topic in a database.

10. A method for distributing a message from a message provider to one or more computer users, the method comprising;

storing, in a database, a plurality of information definition, the information definition comprising a hierarchical context with at least one branch;

obtaining message information from the message provider, comprising allowing the message provider to specify values for at least one information definition;

obtaining profile information from the at least one computer user, comprising allowing the at least one computer user to specify values for at least one information definition;

generating, utilizing a second set of information provided by the message provider, a logically branched Boolean, computer-interpretable message rule referencing one or more information definition branch;

generating, utilizing a third set of information provided by the at least one computer user, a logically branched Boolean, computer-interpretable profile rule referencing one or more information definition branch;

generating, utilizing a fourth set of information provided by the an administrator, a logically branched Boolean, computer-interpretable system rule referencing one or more information definition branch determining, utilizing an interpretation of the context of each referenced branch together and individually, whether a computer user is eligible to receive the message on the basis of the message rule, the profile rule and the system rule;

transmitting the message to a computer user if the computer user is eligible to receive the message;

wherein the message is formatted as Extensible Markup Language data comprising of multiple arbitrary nested and repeated elements and groups of elements; and whereby, a message provider will be able to select a set of computer users that the message provider would like to receive the message, a computer user will be able to select a set of messages that the computer users would like to receive, and an administrator will be able to select a set of messages that the computer users should or should not receive all by only referencing branches from the information definitions.

11. The method of claim 10, wherein the message, system and profile rules comprise a representation in natural language where the representation does not require specific knowledge of the form of the contextual hierarchical information definitions or require use of a special query or procedural language in the representation or require use of a special structure of the representation.

12. The method of claim 10, wherein the message, system, and profile rules comprises Extensible Markup Language data.

13. The method of claim 10, wherein the determining step comprises:

determining, utilizing the references contained in the message rule and the system rule to information relating to the information definitions, a preliminary set of potentially eligible computer user profiles;

utilizing a computer algorithm, indexing the profile rule with data relating to profiles of computer users of the preliminary set; and applying the message rule, profile rule and system rule to the preliminary set.

14. The method of claim 13, wherein the determining the preliminary set comprises:

generating a logically conditional, boolean, computer-interpretable preliminary rule utilizing the references contained in the message rule and the system rule to information relating to the information definitions, and determining the preliminary set utilizing the preliminary rule.

15. The method of claim 14, wherein generating the preliminary rule comprises prioritizing the message rule and the system rule in accordance with an option set by an administrator.

* * * * *